(12) United States Patent
Myer et al.

(10) Patent No.: US 8,688,569 B1
(45) Date of Patent: Apr. 1, 2014

(54) SYSTEM AND METHOD FOR POST CLOSING AND CUSTODY SERVICES

(75) Inventors: John Peter Myer, New York, NY (US); Kevin Vincent Fisher, Staten Island, NY (US); Zohar Swaine, Teaneck, NJ (US); John J. Chappell, Smithville, MO (US)

(73) Assignee: JPMorgan Chase Bank, N.A., New York, NY (US)

( * ) Notice: Subject to any disclaimer, the term of this patent is extended or adjusted under 35 U.S.C. 154(b) by 989 days.

(21) Appl. No.: 11/086,569

(22) Filed: Mar. 23, 2005

(51) Int. Cl.
  *G06Q 40/00* (2012.01)
  *G06Q 50/00* (2012.01)
(52) U.S. Cl.
  USPC .............. 705/38; 705/35; 705/39; 705/313; 705/316
(58) Field of Classification Search
  USPC .............................. 705/37, 38, 64; 715/512
  See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |
| 4,933,842 A | 6/1990 | Durbin et al. |
| 5,121,469 A | 6/1992 | Richards et al. |
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |

(Continued)

FOREIGN PATENT DOCUMENTS

| | | |
|---|---|---|
| WO | WO 98/43170 | 10/1998 |
| WO | WO 01/20530 | 3/2001 |

(Continued)

OTHER PUBLICATIONS

Freddie Mac's Document Custody Procedure Overview, Dec. 2003, pp. 1-2 and 7-16.*

(Continued)

*Primary Examiner* — Gregory Johnson
(74) *Attorney, Agent, or Firm* — Hunton & Williams LLP

(57) ABSTRACT

A system and method for post closing and custody services is disclosed. The method may comprise: receiving loan documents directly from a closing agent upon closing of a loan; imaging at least a portion of the loan documents; making one or more of the imaged documents accessible to one or more post closing users; and performing a custody review of the loan documents prior to other post closing services associated with the loan.

20 Claims, 6 Drawing Sheets

(56) References Cited

U.S. PATENT DOCUMENTS

| | | | |
|---|---|---|---|
| 5,778,157 | A | 7/1998 | Oatman et al. |
| 5,783,808 | A | 7/1998 | Josephson |
| 5,787,402 | A | 7/1998 | Potter et al. |
| 5,806,047 | A | 9/1998 | Hackel et al. |
| 5,806,048 | A | 9/1998 | Kiron et al. |
| 5,819,273 | A | 10/1998 | Vora et al. |
| 5,832,461 | A | 11/1998 | Leon et al. |
| 5,845,266 | A | 12/1998 | Lupien et al. |
| 5,864,827 | A | 1/1999 | Wilson |
| 5,890,140 | A | 3/1999 | Clark et al. |
| 5,913,214 | A | 6/1999 | Madnick et al. |
| 5,918,218 | A | 6/1999 | Harris et al. |
| 5,922,044 | A | 7/1999 | Banthia |
| 5,940,810 | A | 8/1999 | Traub et al. |
| 5,944,784 | A | 8/1999 | Simonoff et al. |
| 5,946,667 | A | 8/1999 | Tull, Jr. et al. |
| 5,950,176 | A | 9/1999 | Keiser et al. |
| 5,966,531 | A | 10/1999 | Skeen et al. |
| 5,966,672 | A | 10/1999 | Knupp |
| 5,966,700 | A * | 10/1999 | Gould et al. .................... 705/38 |
| 5,970,479 | A | 10/1999 | Shepherd |
| 5,986,673 | A | 11/1999 | Martz |
| 5,995,943 | A | 11/1999 | Bull et al. |
| 6,006,206 | A | 12/1999 | Smith et al. |
| 6,012,046 | A | 1/2000 | Lupien et al. |
| 6,018,714 | A | 1/2000 | Risen, Jr. |
| 6,018,721 | A | 1/2000 | Aziz et al. |
| 6,023,280 | A | 2/2000 | Becker et al. |
| 6,029,146 | A | 2/2000 | Hawkins et al. |
| 6,029,147 | A | 2/2000 | Horadan et al. |
| 6,035,287 | A | 3/2000 | Stallaert et al. |
| 6,049,783 | A | 4/2000 | Segal et al. |
| 6,052,673 | A | 4/2000 | Leon et al. |
| 6,055,522 | A | 4/2000 | Krishna et al. |
| 6,058,378 | A | 5/2000 | Clark et al. |
| 6,061,662 | A | 5/2000 | Makivic |
| 6,064,984 | A | 5/2000 | Ferguson et al. |
| 6,073,104 | A | 6/2000 | Field |
| 6,073,109 | A | 6/2000 | Flores et al. |
| 6,073,115 | A | 6/2000 | Marshall |
| 6,078,903 | A | 6/2000 | Kealhofer |
| 6,078,914 | A | 6/2000 | Redfern |
| 6,078,956 | A | 6/2000 | Bryant et al. |
| 6,081,774 | A | 6/2000 | de Hita et al. |
| 6,088,685 | A | 7/2000 | Kiron et al. |
| 6,092,056 | A | 7/2000 | Tull, Jr. et al. |
| 6,105,005 | A | 8/2000 | Fuhrer |
| 6,131,082 | A | 10/2000 | Hargrave, III et al. |
| 6,134,600 | A | 10/2000 | Liu |
| 6,148,298 | A | 11/2000 | LaStrange et al. |
| 6,173,270 | B1 | 1/2001 | Cristofich et al. |
| 6,173,276 | B1 | 1/2001 | Kant et al. |
| 6,178,420 | B1 | 1/2001 | Sassano |
| 6,185,567 | B1 | 2/2001 | Ratnaraj et al. |
| 6,195,647 | B1 | 2/2001 | Martyn et al. |
| 6,226,623 | B1 | 5/2001 | Schein et al. |
| 6,233,566 | B1 | 5/2001 | Levine et al. |
| 6,236,972 | B1 | 5/2001 | Shkedy |
| 6,236,977 | B1 | 5/2001 | Verba et al. |
| 6,243,670 | B1 | 6/2001 | Bessho et al. |
| 6,260,021 | B1 | 7/2001 | Wong et al. |
| 6,263,321 | B1 | 7/2001 | Daughtery, III |
| 6,263,335 | B1 | 7/2001 | Paik et al. |
| 6,266,683 | B1 | 7/2001 | Yehuda et al. |
| 6,272,474 | B1 | 8/2001 | Garcia |
| 6,275,229 | B1 | 8/2001 | Weiner et al. |
| 6,278,982 | B1 | 8/2001 | Korhammer et al. |
| 6,282,537 | B1 | 8/2001 | Madnick et al. |
| 6,285,986 | B1 | 9/2001 | Andrews |
| 6,285,989 | B1 | 9/2001 | Shoham |
| 6,304,858 | B1 | 10/2001 | Mosler et al. |
| 6,313,854 | B1 | 11/2001 | Gibson |
| 6,317,726 | B1 | 11/2001 | O'Shaughnessy |
| 6,317,728 | B1 | 11/2001 | Kane |
| 6,321,212 | B1 | 11/2001 | Lange |
| 6,323,881 | B1 | 11/2001 | Broulik et al. |
| 6,332,163 | B1 | 12/2001 | Bowman-Amuah |
| 6,338,055 | B1 | 1/2002 | Hagmann et al. |
| 6,338,068 | B1 | 1/2002 | Moore et al. |
| 6,343,287 | B1 | 1/2002 | Kumar et al. |
| 6,347,307 | B1 | 2/2002 | Sandhu et al. |
| 6,349,291 | B1 | 2/2002 | Varma |
| 6,356,933 | B2 | 3/2002 | Mitchell et al. |
| 6,360,210 | B1 | 3/2002 | Wallman |
| 6,366,908 | B1 | 4/2002 | Chong et al. |
| 6,381,585 | B1 | 4/2002 | Maples et al. |
| 6,381,586 | B1 | 4/2002 | Glasserman et al. |
| 6,385,660 | B2 | 5/2002 | Griesemer et al. |
| 6,389,413 | B2 | 5/2002 | Takahashi et al. |
| 6,389,452 | B1 | 5/2002 | Glass |
| 6,401,080 | B1 | 6/2002 | Bigus et al. |
| 6,408,282 | B1 | 6/2002 | Buist |
| 6,418,417 | B1 | 7/2002 | Corby et al. |
| 6,421,653 | B1 | 7/2002 | May |
| 6,424,980 | B1 | 7/2002 | Iizuka et al. |
| 6,429,868 | B1 | 8/2002 | Dehner, Jr. et al. |
| 6,442,545 | B1 | 8/2002 | Feldman et al. |
| 6,446,110 | B1 | 9/2002 | Lection et al. |
| 6,457,066 | B1 | 9/2002 | Mein et al. |
| 6,460,021 | B1 | 10/2002 | Kirksey |
| 6,480,882 | B1 | 11/2002 | McAdam et al. |
| 6,489,954 | B1 | 12/2002 | Powlette |
| 6,490,584 | B2 | 12/2002 | Barrett et al. |
| 6,493,681 | B1 | 12/2002 | Tertitski et al. |
| 6,510,406 | B1 | 1/2003 | Marchisio |
| 6,516,303 | B1 | 2/2003 | Wallman |
| 6,516,308 | B1 | 2/2003 | Cohen |
| 6,523,022 | B1 | 2/2003 | Hobbs |
| 6,556,987 | B1 | 4/2003 | Brown et al. |
| 6,564,250 | B1 | 5/2003 | Nguyen |
| 6,581,056 | B1 | 6/2003 | Rao |
| 6,581,062 | B1 | 6/2003 | Draper et al. |
| 6,598,028 | B1 | 7/2003 | Sullivan et al. |
| 6,601,044 | B1 | 7/2003 | Wallman |
| 6,611,825 | B1 | 8/2003 | Billheimer et al. |
| 6,615,187 | B1 | 9/2003 | Ashenmil et al. |
| 6,629,097 | B1 | 9/2003 | Keith |
| 6,631,373 | B1 | 10/2003 | Otani et al. |
| 6,633,868 | B1 | 10/2003 | Min et al. |
| 6,711,554 | B1 * | 3/2004 | Salzmann et al. .............. 705/64 |
| 7,085,759 | B2 | 8/2006 | Kingham et al. |
| 7,107,241 | B1 * | 9/2006 | Pinto ............................... 705/38 |
| 7,191,392 | B1 * | 3/2007 | Coar ............................. 715/234 |
| 7,222,094 | B2 | 5/2007 | Ross |
| 7,313,541 | B2 | 12/2007 | Wise et al. |
| 7,392,210 | B1 | 6/2008 | MacKay et al. |
| 7,392,212 | B2 | 6/2008 | Hancock et al. |
| 2001/0011241 | A1 | 8/2001 | Nemzow |
| 2001/0011242 | A1 | 8/2001 | Allex et al. |
| 2001/0018674 | A1 | 8/2001 | Schein et al. |
| 2001/0025264 | A1 | 9/2001 | Deaddio et al. |
| 2001/0029482 | A1 * | 10/2001 | Tealdi et al. .................... 705/38 |
| 2001/0032217 | A1 | 10/2001 | Huang |
| 2001/0042034 | A1 | 11/2001 | Elliott |
| 2001/0043235 | A1 | 11/2001 | Best et al. |
| 2001/0044771 | A1 | 11/2001 | Usher et al. |
| 2001/0056398 | A1 | 12/2001 | Scheirer |
| 2002/0002530 | A1 | 1/2002 | May |
| 2002/0004777 | A1 | 1/2002 | Foster et al. |
| 2002/0007335 | A1 | 1/2002 | Millard et al. |
| 2002/0007358 | A1 | 1/2002 | Johnson et al. |
| 2002/0013753 | A1 | 1/2002 | Marks de Chabris et al. |
| 2002/0013862 | A1 | 1/2002 | Orchard et al. |
| 2002/0016762 | A1 | 2/2002 | Feilbogen et al. |
| 2002/0016819 | A1 | 2/2002 | Sugimoto et al. |
| 2002/0018077 | A1 | 2/2002 | Powlette |
| 2002/0022956 | A1 | 2/2002 | Ukrainczyk et al. |
| 2002/0023053 | A1 | 2/2002 | Szoc et al. |
| 2002/0026405 | A1 | 2/2002 | Haar |
| 2002/0026449 | A1 | 2/2002 | Azencott |
| 2002/0026462 | A1 | 2/2002 | Shotton, Jr. et al. |
| 2002/0029183 | A1 * | 3/2002 | Vlahoplus et al. .............. 705/37 |
| 2002/0029194 | A1 * | 3/2002 | Lewis et al. .................... 705/39 |
| 2002/0032644 | A1 | 3/2002 | Corby et al. |

(56) References Cited

U.S. PATENT DOCUMENTS

| | | |
|---|---|---|
| 2002/0042767 A1 | 4/2002 | Kwan |
| 2002/0049665 A1 | 4/2002 | Solomon et al. |
| 2002/0049666 A1 | 4/2002 | Reuter et al. |
| 2002/0052835 A1* | 5/2002 | Toscano ............... 705/38 |
| 2002/0054115 A1 | 5/2002 | Mack et al. |
| 2002/0059141 A1 | 5/2002 | Davies |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0099646 A1 | 7/2002 | Agarwal et al. |
| 2002/0099656 A1 | 7/2002 | Poh Wong |
| 2002/0111901 A1* | 8/2002 | Whitney ............... 705/38 |
| 2002/0112056 A1 | 8/2002 | Baldwin et al. |
| 2002/0116331 A1 | 8/2002 | Cataline et al. |
| 2002/0123947 A1 | 9/2002 | Yuste et al. |
| 2002/0130868 A1 | 9/2002 | Smith |
| 2002/0138390 A1 | 9/2002 | May |
| 2002/0138414 A1* | 9/2002 | Baker, IV ............... 705/38 |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2003/0004942 A1 | 1/2003 | Bird |
| 2003/0009411 A1 | 1/2003 | Ram et al. |
| 2003/0018558 A1* | 1/2003 | Heffner et al. ............ 705/37 |
| 2003/0018714 A1 | 1/2003 | Mikhailov et al. |
| 2003/0033212 A1 | 2/2003 | Sandhu et al. |
| 2003/0035561 A1 | 2/2003 | Hsieh |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney et al. |
| 2003/0154071 A1 | 8/2003 | Shreve |
| 2003/0158949 A1 | 8/2003 | Miller et al. |
| 2003/0163401 A1 | 8/2003 | Dines et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0039666 A1* | 2/2004 | Fudali et al. ............ 705/35 |
| 2004/0049445 A1* | 3/2004 | Kishore ............... 705/37 |
| 2004/0064397 A1 | 4/2004 | Lynn et al. |
| 2004/0064402 A1* | 4/2004 | Dreyer et al. ............ 705/38 |
| 2004/0078248 A1 | 4/2004 | Altschuler |
| 2004/0078322 A1* | 4/2004 | Sumi et al. ............ 705/38 |
| 2004/0083164 A1* | 4/2004 | Schwartz et al. ............ 705/38 |
| 2004/0103003 A1 | 5/2004 | Mayers et al. |
| 2004/0111619 A1* | 6/2004 | Laurie et al. ............ 713/179 |
| 2004/0128229 A1* | 7/2004 | Raines et al. ............ 705/38 |
| 2004/0128230 A1* | 7/2004 | Oppenheimer et al. ........ 705/38 |
| 2004/0148247 A1 | 7/2004 | Miller et al. |
| 2004/0162775 A1 | 8/2004 | Winklevoss et al. |
| 2004/0167850 A1* | 8/2004 | Dreyer et al. ............ 705/38 |
| 2004/0215553 A1* | 10/2004 | Gang et al. ............ 705/38 |
| 2004/0215555 A1* | 10/2004 | Kemper et al. ............ 705/38 |
| 2004/0220885 A1* | 11/2004 | Salzmann et al. ............ 705/80 |
| 2004/0225584 A1* | 11/2004 | Quinn et al. ............ 705/35 |
| 2004/0225594 A1* | 11/2004 | Nolan et al. ............ 705/38 |
| 2004/0225596 A1* | 11/2004 | Kemper et al. ............ 705/38 |
| 2004/0225597 A1* | 11/2004 | Oppenheimer et al. ........ 705/38 |
| 2005/0060256 A1 | 3/2005 | Peterson et al. |
| 2005/0086148 A1 | 4/2005 | Woodruff et al. |
| 2005/0086170 A1 | 4/2005 | Rao |
| 2005/0102213 A1 | 5/2005 | Savasoglu et al. |
| 2005/0102214 A1 | 5/2005 | Speth et al. |
| 2006/0074793 A1* | 4/2006 | Hibbert et al. ............ 705/38 |
| 2007/0005498 A1 | 1/2007 | Cataline et al. |
| 2007/0016520 A1* | 1/2007 | Gang et al. ............ 705/38 |
| 2007/0043654 A1 | 2/2007 | Libman |
| 2007/0162387 A1 | 7/2007 | Cataline et al. |
| 2008/0086404 A1 | 4/2008 | Wise et al. |

FOREIGN PATENT DOCUMENTS

| | | |
|---|---|---|
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Ginnie Mae MBS Guide, 2003, Chapter 1, pp. 1-14.*
Ginnie Mae MBS Guide, 2003, Chapter 10, p. 1.*
M. William Friis, "Goodbye to Paper?", American Bankers Association. ABA Banking Journal. New York: Mar. 1989. vol. 81, Iss. 3; 5 pages.*
Anonymous, "What we like about this site", Internet Banking Growth Strategies. Storm Lake: Jan. 2002. vol. 2, Iss. 5; p. 1.*
Ginnie Mae MBS Guide, 2003, Chapter 1, pp. 1-14 and Chapter 10, p. 1.*
Freedie Mac, Chapter 2, Custodian's Duties and Responsibilities, Dec. 2003, pp. 1-8.*
A new strategy for giving away your money, Rachel Emma Silverman, Wall Street Journal, D1.
Investigating Systems.
Manco et al., A Framework for Adaptive Mail Classification, 14th IEEE Conference on Tools with Artificial Intelligence (ICTAI'02), Nov. 4, 2002, p. 387.
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.

(56) References Cited

OTHER PUBLICATIONS

Martin, Email Report, Issue 11, Aug. 16, 2001, printed Aug. 2, 2005.
Fast Email Extractor 4.4.
Form 10-K, United States Securities and Exchange Commission, no date,year ending Dec. 31, 2003.
Freddie Mac's document custody procedure overview—2003.
Pila, In Case of Emergency; contingent capital.
Intellseek and Inxight Partner to Provide New Business Intelligence Solutions, www.inxight.com/news/021029_intelliseek.html, Oct. 29, 2002.
May, Modeling and Querying Structure and Contents of the Web, 10th International Workshop on Database & Amp; Expert Systems Applications, Sep. 1, 1999, p. 721.
Rupali et al., Phrase-based Text Representation for Managing the Web Documents.
Lam et al., Querying Web Data—The WebQA Approach.
Rising to the challenge of global STP, Euromoney Publications PLC Global Inventor, Nov. 1, 1999, pp. 51-52; Issn. 0951-3604.
STP in the Bond Market?, Wall Street & Technology, Dec. 1, 2002, p. 20.
Ericson, Softwerc releases patent-pending.
IBM Corp., Strict Read Order Control for a Queing System.
Carchiolo et al., Structuring the Web.
Witten et al., Text Mining: A New Frontier for Lossless Compression.
Fan et al., The Internet and Future Financial Markets; Industry Trend or Event, Association for Computing Machinery, Inc., Sec. 11, vol. 43; Nov. 1, 2000, p. 82; Issn: 0001-0782.
Emery, et al., The Measurement of Liquidity, Journal of Accounting Research, vol. 20, No. 2, Part 1, p. 290-303, Autumn 1982.
Calado, The Web-DL Environment for Building Digital Libraries from the Web.
Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; Issn: 0014-2433.
Elkayam, Using Indexed Bonds.
Myllymaki, With Standard XML Technologies.
Hewlett-Packard, x4queview.org.

\* cited by examiner

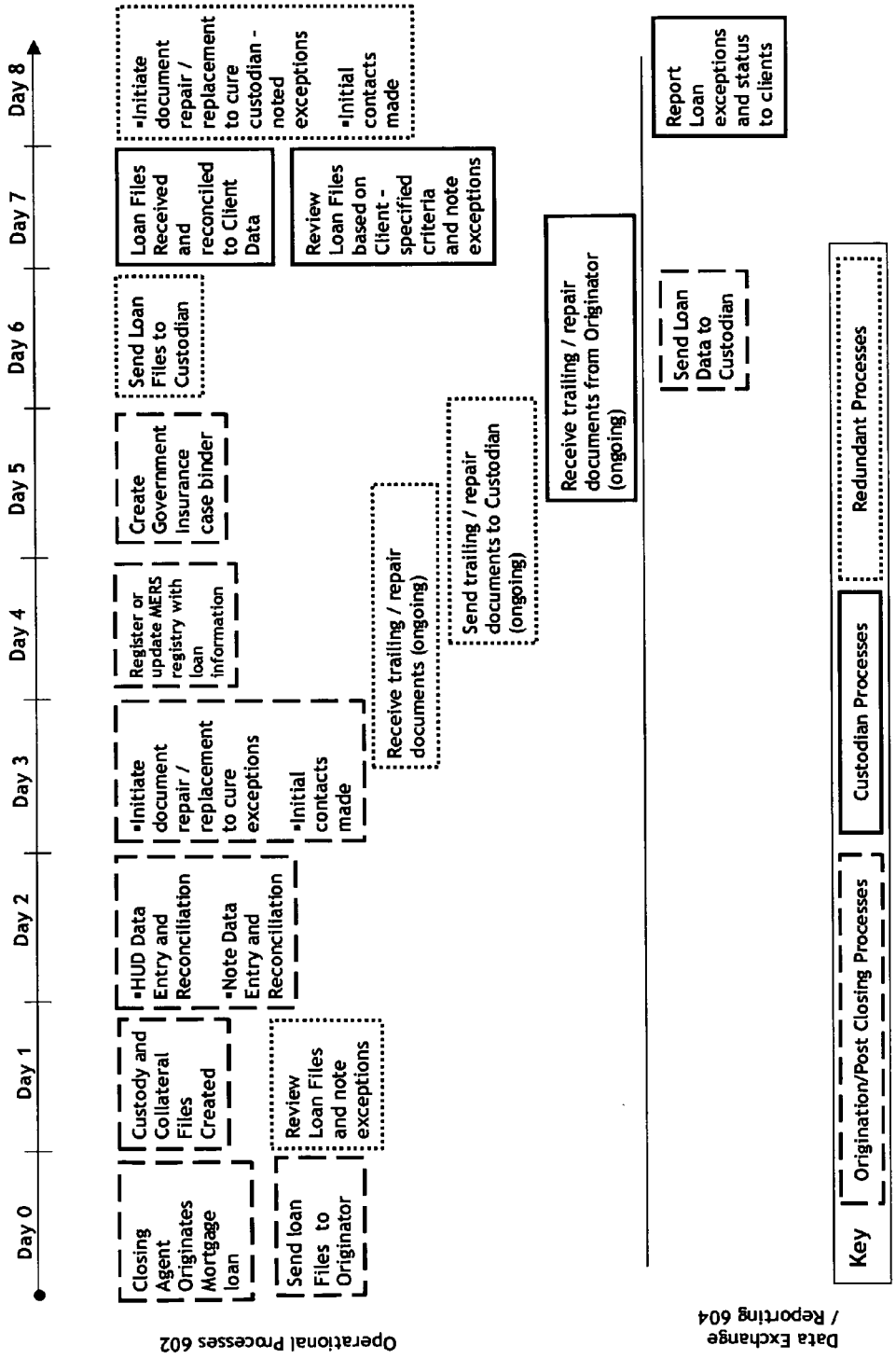

SYSTEM AND METHOD FOR POST CLOSING AND CUSTODY SERVICES

FIELD OF THE INVENTION

The present invention relates generally to banking and financial services. More particularly, the present invention relates to a system and method for post closing and custody services.

BACKGROUND OF THE INVENTION

For a loan originator such as a mortgage company, time is literally money. During a time period after a mortgage loan is originated but before it is securitized and eventually sold on a secondary market, the mortgage company incurs a capital cost to finance at least a portion of the loan amount. The longer the loan remains unsecuritized, the bigger the capital cost to the mortgage company. For a typical mortgage company that originates 500 loans per day with an average loan amount of $175,000, it needs 500×$175,000=$87,500,000 to fully finance one day's worth of loan originations. Since warehouse lenders typically advance 95% of collateral value for mortgage loans, the mortgage company has to provide 5%×$87,500,000=$4,375,000, which must be financed with equity capital. At a capital cost of 12% per annum, each day its loans remain unsecuritized may cost the mortgage company $525,000. Therefore, it is desirable to shorten the time it takes to securitize a loan. Even a couple of days' reduction in securitization cycle time can translate into substantial savings for a loan originator.

However, traditional approaches for loan securitization involve post closing services and document custody services that are far from efficient. FIG. 1 illustrates a prior art method for processing loan documents. In step 102, a closing agent 10 (e.g., a settlement/title company) may close a loan with a borrower and prepare a package of loan documents. The package typically contains 100-150 pages of loan documents. Then, the package may be shipped overnight to a loan originator 12 (e.g., a mortgage company). In step 104, the loan originator 12 may perform a number of post closing functions, such as HUD (Department of Housing and Urban Development) form entry and reconciliation, Promissory Note entry and reconciliation, document repairs, MERS (Mortgage Electronic Registration System) registration, and government insurance. In step 106, the loan originator 12 may review the loan documents for exceptions such as, for example, missing signatures and/or missing papers. The loan originator 12 may collect repair documents in order to cure exceptions, if any. Then, all the loan documents and repair documents may be shipped from the loan originator 12 to a document custodian 14 (e.g., an investment bank). The document custodian 14 may, in step 108, provide custody services, such as custody review and document safekeeping, in support of warehouse lending and securitization. If any document exception is found in step 108, the loan originator 12 may be called upon to cure the exception.

The prior art method shown in FIG. 1 is inefficient for at least the following reasons. First, the two separate shipments of the documents, from the closing agent 10 to the loan originator 12 and then from the loan originator 12 to the document custodian 14, take at least two days. Second, the document review by both the loan originator 12 and the document custodian 14 is redundant. Third, additional time is needed for communications between the document custodian 14 and the loan originator 12 to cure exceptions revealed during custody review. Some mortgage companies have attempted to cure the deficiencies noted above by co-locating their post closing operations with document custodian operation. However, this solution only achieves limited success in improving efficiency and may not always be feasible.

The capital costs associated with securitization delay may have a greater impact on small to mid-sized loan originators whose loan volume does not accumulate fast enough. For these smaller originators, longer funding periods are typically required as saleable loans are pooled into batched whole loan sales. In addition, the smaller originators may not be in a position to achieve full market prices for their loan sales.

Other problems and drawbacks also exist.

In view of the foregoing, it would be desirable to provide a solution for streamlining post closing and custody services which overcomes the above-described deficiencies and shortcomings.

SUMMARY OF THE INVENTION

One embodiment of the present invention comprises a method for post closing and custody services. The method may comprise: receiving loan documents directly from a closing agent upon closing of a loan; imaging at least a portion of the loan documents; making one or more of the imaged documents accessible to one or more post closing users; and performing a custody review of the loan documents prior to other post closing services associated with the loan.

Another embodiment of the present invention comprises a system for post closing and custody services. The system comprises at least one processor, at least one storage device, and at least one imaging device, wherein: the at least one processor coordinates a delivery of loan documents directly from a closing agent upon closing of a loan; the at least one imaging device converts at least a portion of the loan documents into electronic images; the at least one storage device stores the electronic images; and the at least one processor causes one or more of the electronic images to be accessible to one or more post closing users.

Yet another embodiment of the present invention comprises a method for post closing and custody services. The method comprises: collecting loan documents directly from one or more closing agents, wherein the loan documents are associated with a plurality of loans from one or more loan originators; aggregating loan data and document images associated with the plurality of loans; and providing electronic access to the aggregated loan data and document images.

Still another embodiment of the present invention comprises a system for post closing and custody services. The system comprises a processor, a data storage device, and a user interface, wherein: the data storage device contains loan data and document images associated with a plurality of loans; the processor is operatively coupled to the data storage device to provide information associated with the plurality of loans based on the loan data and the document images; and the user interface facilitates an electronic access to the information, the loan data and the document images.

A further embodiment of the present invention comprises a method for post closing and custody services. The method comprises: receiving loan documents directly from a closing agent upon closing of a loan; imaging at least a portion of the loan documents; storing the loan documents; providing one or more post closing users with a remote and secure access to one or more of the imaged documents; identifying documents that are associated with warehouse lending and securitization of the loan; and reviewing the identified documents to cure exceptions, wherein the one or more post closing users are selected from a group consisting of: a loan originator, a warehouse lender, a loan servicer, a borrower, a document custodian, a post closing service provider, the closing agent, and any person that is authorized to access the loan documents.

Additional features and advantages of the invention will be set forth in the description that follows. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements.

FIG. 6 depicts a prior art timeline for post closing and custody services.

DETAILED DESCRIPTION OF THE INVENTION

Reference will now be made in detail to the present embodiments of the invention, examples of which are illustrated in the accompanying drawings.

Figure 2:
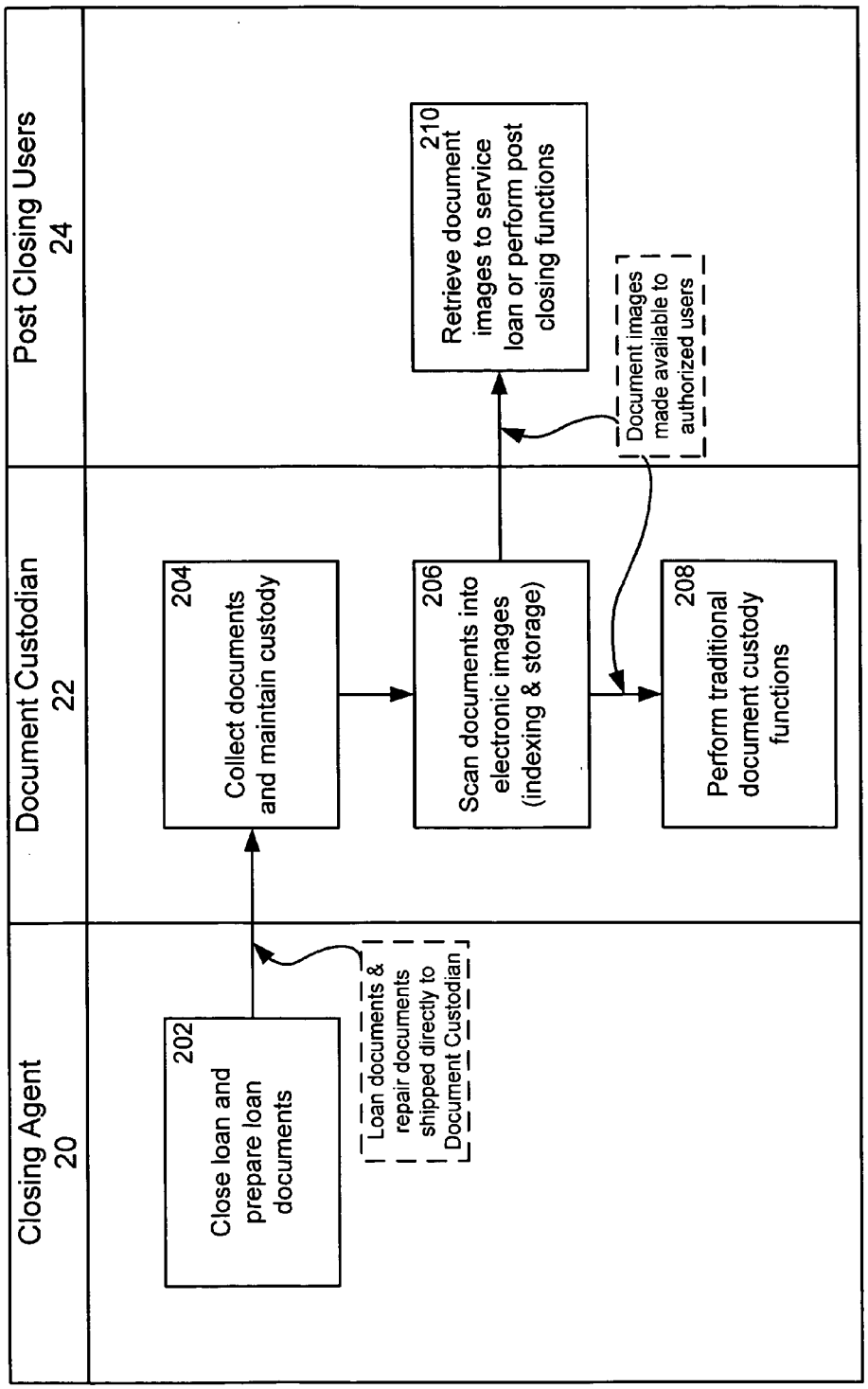
FIG. 2 is a flow chart illustrating an exemplary method for post closing and custody services in accordance with an embodiment of the present invention.

Referring to FIG. 2, there is shown a flow chart illustrating an exemplary method for post closing and custody services in accordance with an embodiment of the present invention.

In step 202, a closing agent 20 may close a loan and prepare loan documents. In contrast to the prior art method illustrated in FIG. 1, the loan documents may be shipped directly to a document custodian 22. Any repair documents or other trailing documents may also be shipped directly to the document custodian 22.

In step 204, the document custodian 204 may collect and maintain custody of all the loan documents, including any repair document. That is, all the physical documents associated with the loan may make one trip from the closing agent 20 to the document custodian 22 and then remain with the document custodian 22.

In step 206, the document custodian 22 may scan some or all of the loan documents into electronic images. The document images, in a computer readable format, may be indexed and stored in one or more databases, for example. Then, the document images may be made available to any authorized users who need access.

One of such users may be the document custodian 22 itself, who may perform traditional document custody functions in step 208 based on the document images. Other post closing users 24 may, in step 210, retrieve the document images either to service the loan or to perform post closing functions. The post closing users 24 may include, for example, a loan originator, a loan servicer, a warehouse lender, a borrower, a government inspector, a post closing service provider, and even the closing agent 20.

Figure 1:
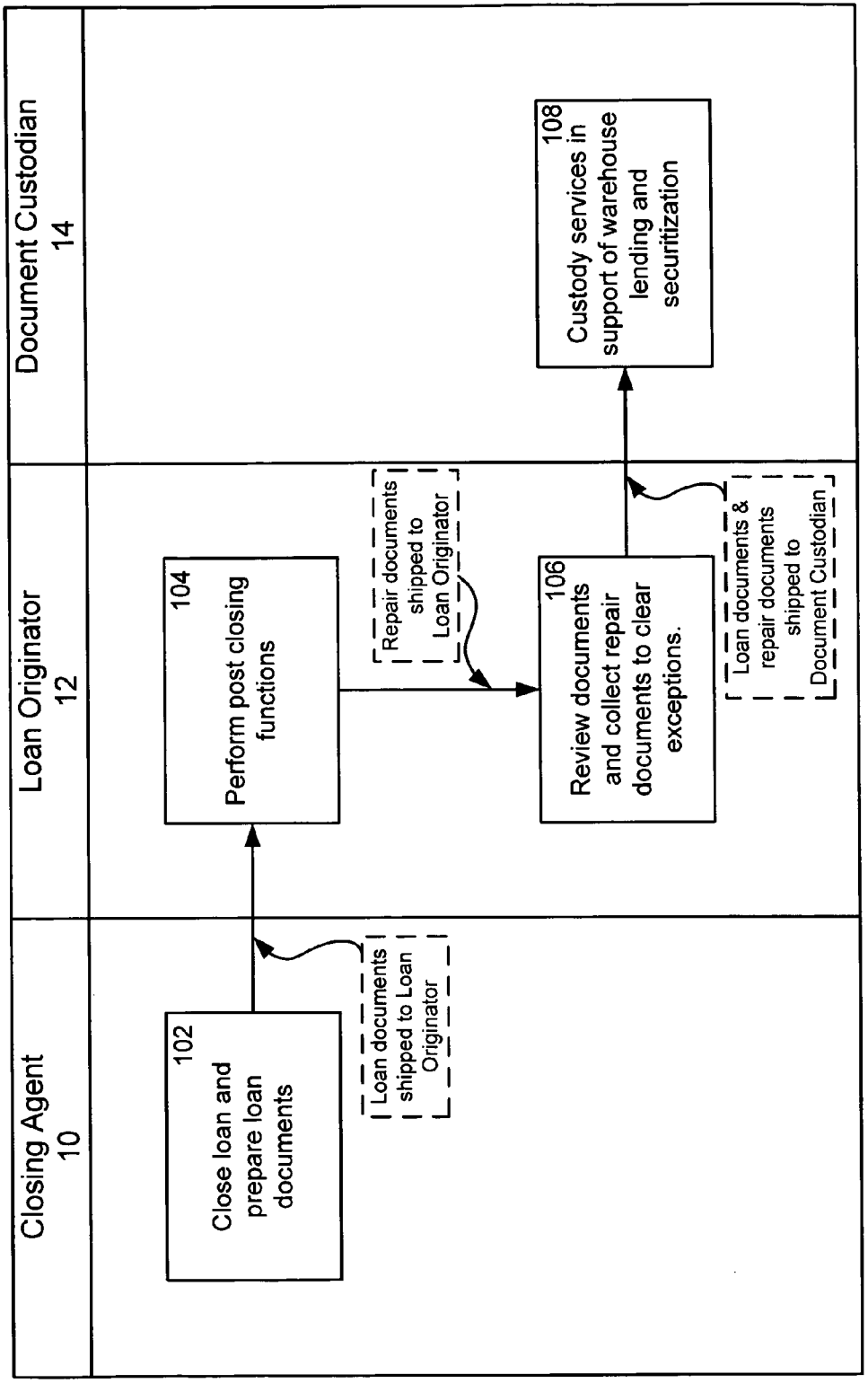
FIG. 1 is a flow chart illustrating a prior art method for post closing and custody services.

Unlike traditional approaches for post closing and custody services, the exemplary method illustrated in FIG. 1 employs imaging technology to allow the document custodian 22 to take possession of the loan documents immediately after the loan is closed. The physical loan documents may then become immobilized and the document images may enable multiple work streams related to the loan documents to take place simultaneously from multiple remote locations. Further, since custody of the loan documents is established prior to a post closing service process, exceptions revealed during a custody review may be cured in the post closing service process. As a result, there may be no redundant review of loan documents by both the document custodian 22 and a post closing service provider.

Figure 3:
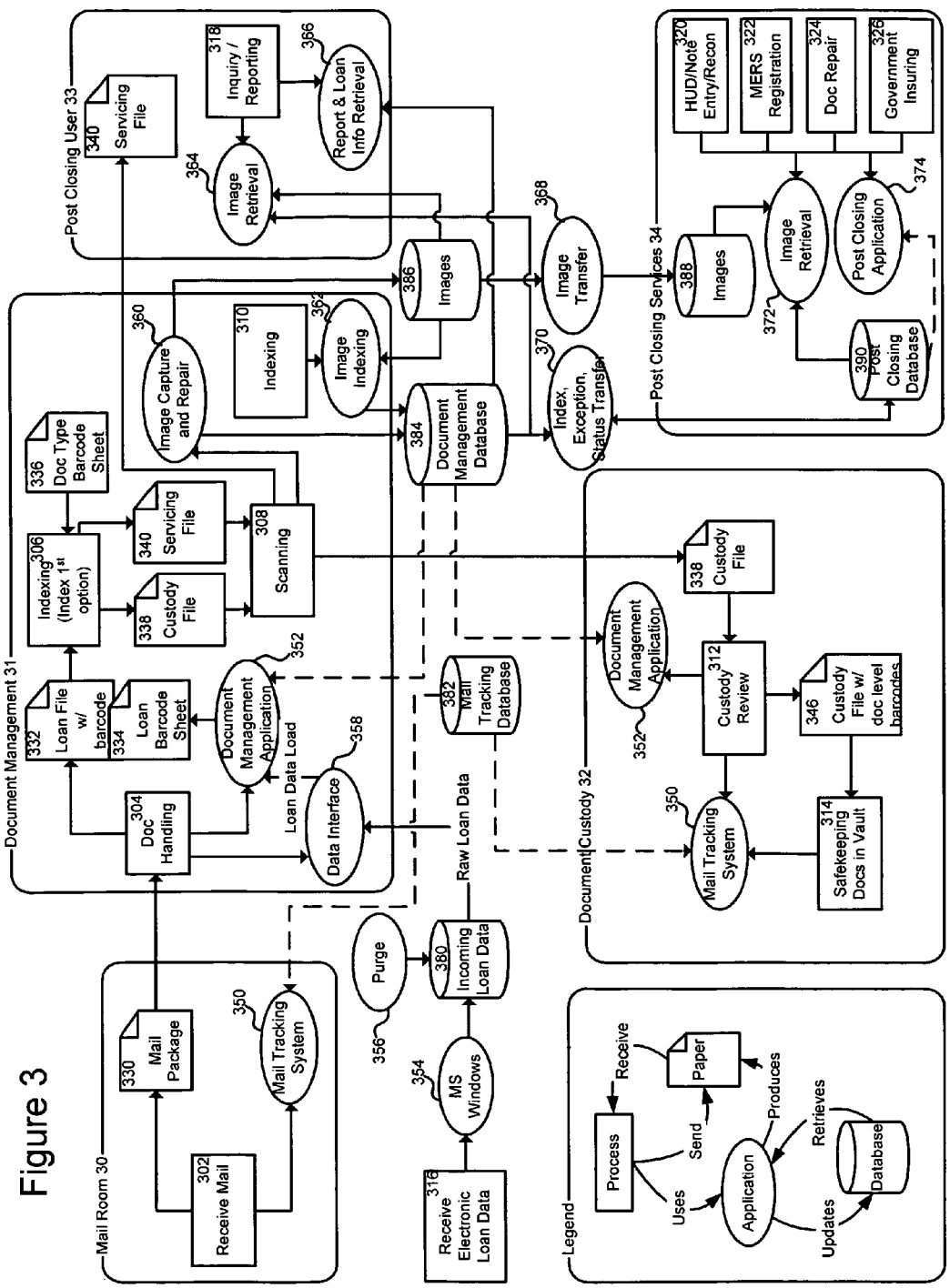
FIG. 3 is a flow diagram illustrating an exemplary process for post closing and custody services in accordance with an embodiment of the present invention.

FIG. 3 is a flow diagram illustrating an exemplary process for post closing and custody services in accordance with an embodiment of the present invention.

In step 302, a document custodian may receive a mail package 330 of loan documents in its mail room 30. The mail package 330 may be shipped directly from a closing agent. A mail tracking system 350 coupled with a mail tracking database 382 may keep records of incoming mail packages. The mail package 330 may then be forwarded to a document management team 31.

In step 304, the loan documents in the mail package 330 may be extracted, examined and labeled. A document management application 352, couple to a document management database 384, may monitor and coordinate the collection of physical loan documents and related electronic loan data. Information related to the loan documents in the mail package 330 may be entered into the document management application 352. Based on the information, the document management application 352 may cause a loan barcode sheet 334 to be generated, such that each loan document may be labeled with a barcode. The document management application 352 may also determine the completeness of a loan package. An alert may be generated if any loan document is missing.

At least a portion of data relating to loan documents may be received via electronic means. For example, in step 316, electronic loan data may be received via secure network communications or removable storage media (e.g., magnetic disks, laser disks or flash memory media) or a combination thereof. The electronic loan data may be received in a Microsoft Windows™ application 354 and then stored in an incoming loan database 380.

The incoming loan database 380 may be periodically purged by an application 356. The electronic loan data may be loaded to the document management application 352 via a data interface 358.

In step 306, the loan documents (with barcodes) 332 may be indexed. A document type barcode sheet 336 may be used to index the documents. The loan documents 332 may be divided into at least two categories. The loan documents that are crucial for securitization may be grouped into a custody file 338, while the non-critical loan documents may be grouped into a servicing file 340.

In step 308, both the custody file 338 and the servicing file 340 may be scanned into electronic images. Any document imaging technology may be implemented to convert the physical loan documents into electronic image data. An image capture and repair application 360 may be utilized to process the scanned images and store them in an images database 386. Once a loan document has been scanned and its image stored, the image capture and repair application 360 may create a record in the document management database 384 to reflect the availability of the document image.

In step 310, the document images stored in the images database 386 may be further indexed by an image indexing application 362. Results of the image indexing may also be tracked by the document management database 384.

Once the loan documents have been scanned into electronic images, the physical documents may be immobilized and remain in possession of the document custodian. A document custody team 32 may perform traditional custody services on the custody file 338. For example, in step 312, the custody file 338 (i.e., either its physical documents or images thereof) may undergo a custody review. The loan documents in the custody file 338 may be reviewed to determine their compliance and enforceability for securitization and warehouse lending purposes. Any exceptions revealed during the custody review may be logged by the document management application 352 into the document management database 384. The mail tracking system 350 may also be accessed to determine whether any trailing document has been received to complete the custody file 338. The loan documents that have gone through the custody review may be labeled with document level barcodes 346 and sent to a vault for safekeeping in step 314.

Other users or vendors who need access to the loan documents in the document custodian's possession may be granted a secured access, local or remote, to the document images stored in the images database 386. A post closing user 33, such as a mortgage company or a business entity that services the loans, may receive the servicing file 340 or gain access to the electronic images of the servicing file 340. The post closing user 33 may also, in step 318, make inquiries and generate reports with regard to the loan documents. For example, an image retrieval application 364 may be implemented to retrieve document images from the images database 386. A report and loan information retrieval application 366 may be implemented to query the document management database 384 for updated information of the loan documents and generate reports.

All or a portion of the post closing services 34 may be carried out within the document custodian entity. Alternatively, the document custodian may outsource all or a portion of the Post closing services 34 to an outside vendor. The post closing services 34 components of HUD or Note entry and reconciliation (320), MERS registration (322), document repair (324), and government insuring (326) may all be performed based on the electronic images of the loan documents. An image transfer interface application 368 may be utilized to download document images from the images database 386 to a local images database 388. The document images may then be retrieved by an image retrieval application 372. A post closing application 374, coupled with a post closing database 390, may be utilized to perform the post closing functions based on the retrieved document images. The post closing vendor may also coordinate with the document management team 31 and the document custody team 32 through an interface application 370 and the document management database 384. For example, any missing document may be reported to the document management team 31, and any exceptions revealed by the document custody team 32 may be cured by the post closing vendor.

Figure 5:
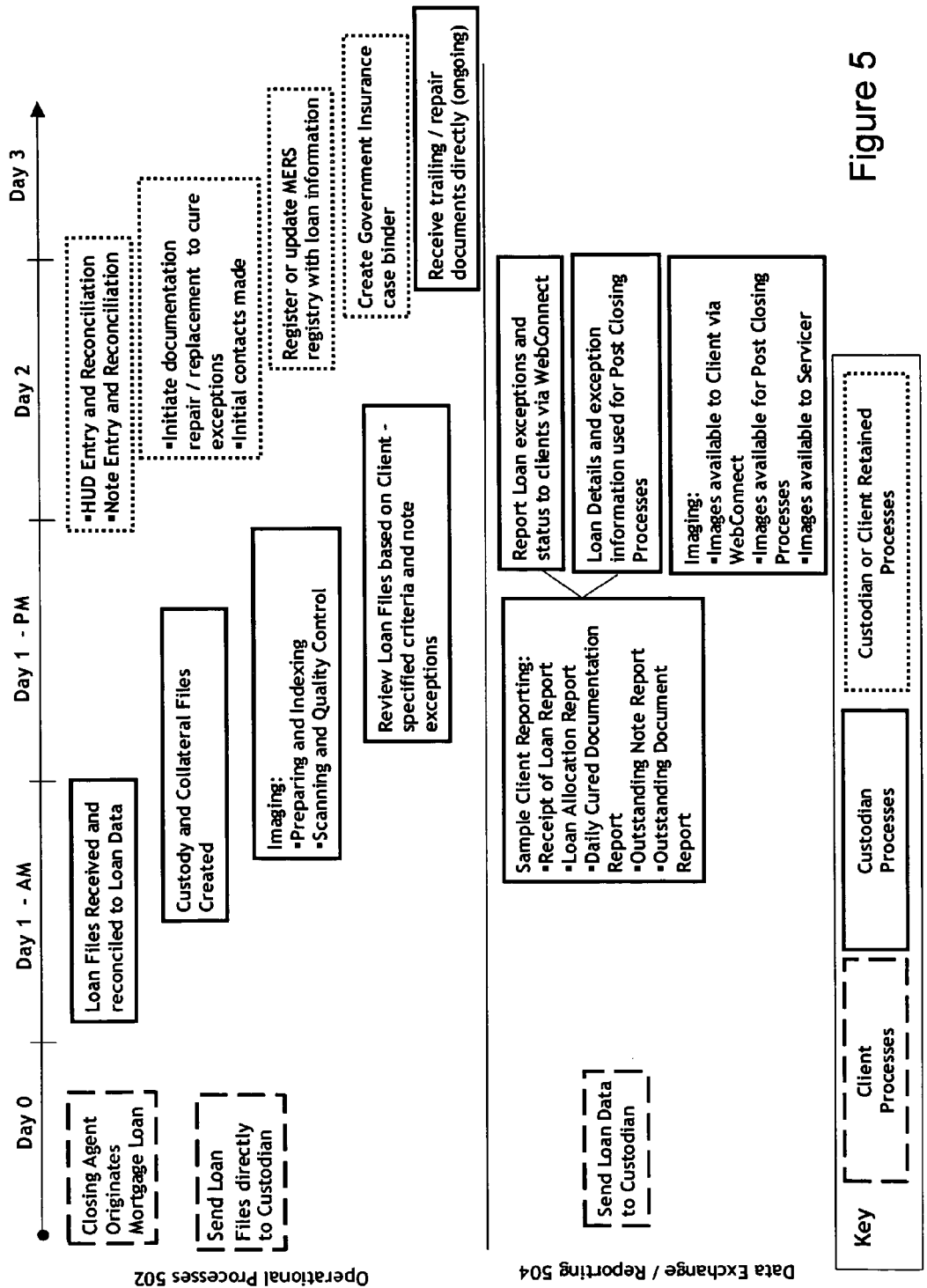
FIG. 5 depicts an exemplary timeline for post closing and custody services in accordance with an embodiment of the present invention.

FIG. 5 depicts an exemplary timeline for post closing and custody services in accordance with an embodiment of the present invention. In FIG. 5, typical processes for post closing and custody services are presented along a time axis that starts from the closing date (Day 0) of a mortgage loan. Those with ordinary skill in the art would appreciate that the temporal relationship among these processes are for illustration purposes only, and the arrangement may be varied without departing from the spirit of the present invention.

The exemplary arrangement in FIG. 5 is presented from a document custodian's point of view. The processes shown in solid-line boxes are those typically performed by the custodian. The processes shown in broken-line boxes are those typically carried out by persons or entities that are considered "clients" of the custodian. These clients may include, for example, loan originators, closing agents, and other post closing service providers. The processes shown in dotted-line boxes are those that may be either implemented by the custodian or outsourced to one of the custodian's clients. Two groups of processes, operational processes 502 and data exchange and reporting processes 504, are presented in parallel along the time axis.

On Day 0, a closing agent may originate a mortgage loan and send the loan files directly to the custodian. At the same time, at least a portion of the loan data may be transmitted to the custodian in electronic form. On Day 1, the custodian may receive the loan files and reconcile them with the electronic loan data. Then the custodian may create custody files and collateral files, image the loan files, review the loan files for exceptions based on client-specified criteria, and note exceptions, if any. The custodian may report the loan exceptions and status to the clients via a user interface called WebConnect Portal. The loan details and exception information may be used for post closing processes. Once the loan files have been imaged and stored in an electronic format, the custodian may make the images available for the clients via the WebConnect Portal. The images may be available to post closing service providers as well as loan servicers, for example. On Day 2, either the custodian or, if the post closing services are outsourced, an external service provider may start post closing processes based at least in part on the document images. The post closing processes may include, for example, HUD form entry and reconciliation and Promissory Note entry and reconciliation. A documentation repair or replacement process may be initiated on Day 2 to cure exceptions reported by the custodian. Initial contacts may be made for repair or replacement documents. On Day 2 and/or Day 3, the loan may be registered or its information updated on MERS registry, and a government insurance case binder may be created. At the same time, the custodian may continue receiving trailing documents or repair documents directly from the closing agent or the loan originator. Overall, it may take only 3-5 days to complete the essential post closing and custody services on the mortgage loan.

Advantages of the arrangement depicted in FIG. 5 may be better appreciated through a comparison with a conventional arrangement of post closing and custody processes such as the one depicted in FIG. 6. The processes shown in solid-line boxes are those performed by the custodian. The processes shown in broken-line boxes are origination or post closing processes. The processes shown in dotted-line boxes are redundant processes. Two groups of processes, operational processes 602 and data exchange and reporting processes 604, are presented in parallel along a time axis.

In this conventional arrangement shown in FIG. 6, the closing agent originates a mortgage loan and sends the loan files to the loan originator. It may take the originator five days to perform post closing services before the loan files are forwarded to the custodian on Day 6. The custodian may then perform traditional custody services on the loan files. Post closing and custody processes implemented according to this conventional arrangement may take a few more days than the arrangement shown in FIG. 5 because some processes carried out by the originator and the custodian are redundant. For example, the Day-1 post closing process of reviewing loan files and noting exceptions is redundant in view of the similar custodian process on Day 7. The Day-8 custodian process of initiating document repair and making initial contacts is redundant in view of the similar post closing process on Day 3. A major difference between the arrangements shown in FIGS. 5 and 6 is that the one in FIG. 5 places the custodian processes ahead of the post closing processes thereby eliminating at least some of the redundant steps shown in FIG. 6.

According to embodiments of the present invention, there may be a number of variations to the above-described process of post closing and custody services. For example, to further shorten the securitization cycles, some or all of the raw loan data may be transmitted to the document custodian in electronic format even before the physical documents are shipped to the document custodian. Some or all of the loan documents may be scanned into electronic images by a closing agent or a local imaging site, such that the document images may be instantly transmitted to the document custodian.

Figure 4:
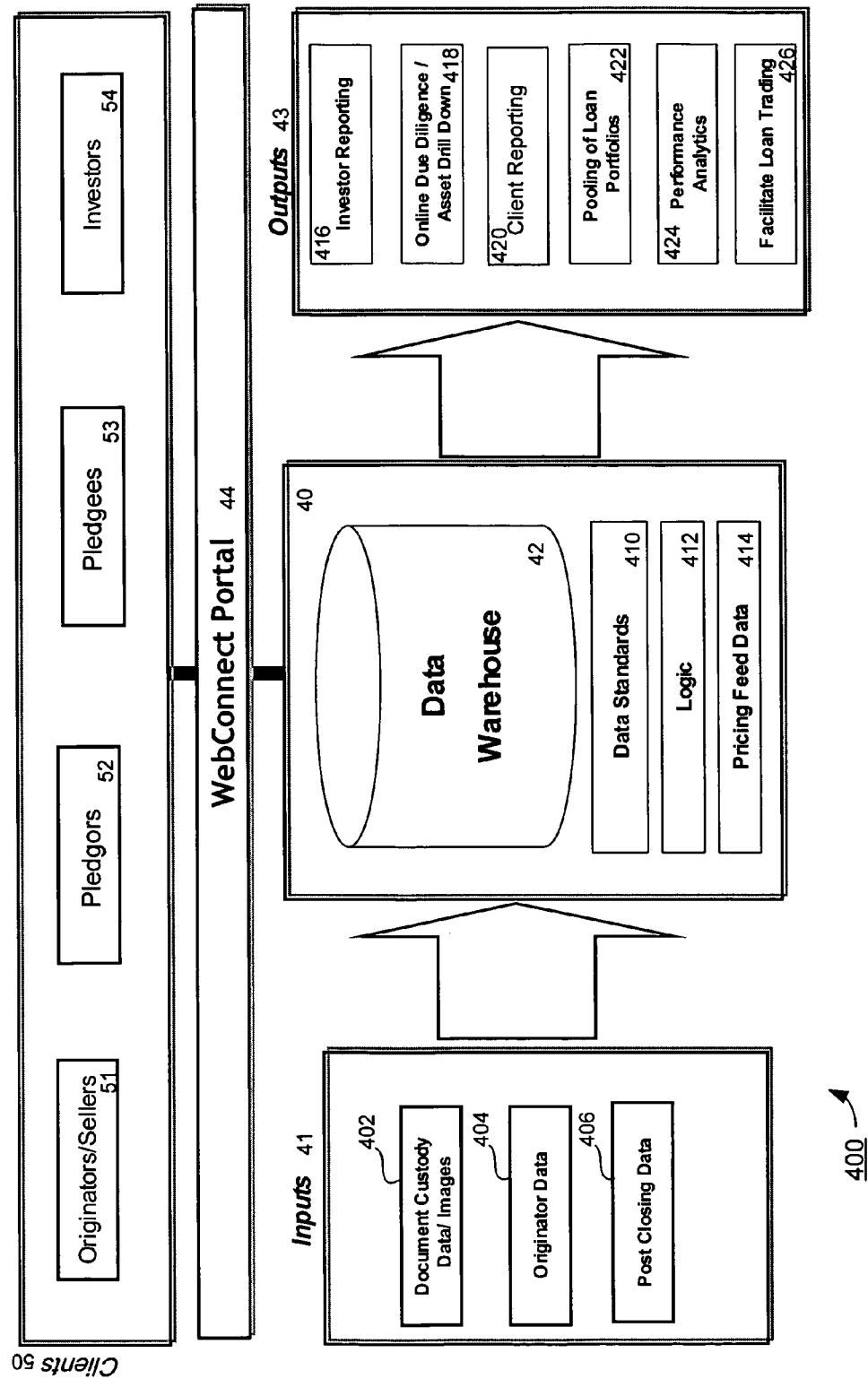
FIG. 4 depicts an exemplary system for mortgage information and trading services in accordance with an embodiment of the present invention.

According to embodiments of the present invention, the above-described system and method for post closing and custody services may be further adapted to provide a suite of mortgage information and trading services. FIG. 4 depicts an exemplary system 400 for providing such services in accordance with an embodiment of the present invention.

The system 400 may comprise a server 40. The server 40 may include or interface to a data warehouse 42 that stores loan data and document images associated with a plurality of mortgage loans. Data storage in the data warehouse 42 may be maintained in compliance with one or more data standards 410 in order to accommodate electronic information exchange. A logic unit 412 within the server 40 may perform logic operations on the loan data based upon selection criterion input by users. The server 40 may also include or have access to pricing feed data 414 that reflect current and/or historical market pricing for mortgage loans as well as prices of the mortgage loans offered for sale. The system 400 may also comprise a web-based user interface, a WebConnect portal 44, through which a number of clients 50 may access the server 40 and the data warehouse 42 to retrieve information and/or to participate in trading of mortgage loans.

The server 40 may receive loan-related data from multiple inputs 41. The inputs 41 may comprise originator data 404, document custody data and document images 402, and post closing data 406. The originator data 404 may include loan data (e.g., borrower name, FICO score, property location, loan amount, and interest rate) generated or collected during the loan origination process (e.g., loan application, approval, and closing). The document custody data and document images 402 may include electronic images of some or all loan documents and loan data (e.g., exceptions noted, pool trial balances or loan listings, release reports, and transaction reports) gathered during the custody review of the loan documents. The post closing data 406 may include additional loan data, such as government insurance status and MERS registration number, generated in post closing services. It may be beneficial to aggregate, in the data warehouse 42, all the loan data from the above-mentioned sources as well as other sources such as a credit bureau database and a geographic information system (GIS) database, for example. As a result, the server 40 and the data warehouse 42 may serve as an information hub and/or a trading platform for mortgage loans.

The server 40 may provide mortgage information and trading services based on the various data outputs 43. The services may include, but are not limited to, investor reporting 416, online due diligence 418, client reporting 420, pooling of loan portfolios 422, performance analytics 424, and loan trading 426. The investor reporting 416 may report loan details such as loan-to-value (LTV) ratio, loan amount, interest rate, property address, borrower FICO score, and concentration reports. The online due diligence 418 may provide document images for audit review, analytics such a historical pricing information of mortgages with similar characteristics such as interest rate and maturity, and scenario analysis tools that allow users to forecast the impact of environmental changes such as changes in interest rate or default rates on mortgage values. The client reporting 420 may provide loan documents held, exceptions noted, pool trial balances (loan listings), release reports, and transaction reports. The loan trading facilitation 422 may provide contact information of sellers, pledgors, pledgees and investors, communication links, and trade instruction facilities, for example.

The clients 50 serviced by the system 400 may include, but are not limited to, loan originators or loan sellers 51, borrowers 52, warehouse lenders 53, and investors or loan buyers 54.

The system 400 may greatly benefit the loan originators or loan sellers 51, especially those small to mid-sized originators. By offloading their loans into the system 400, the loan sellers 51 do not have to maintain a loan sales infrastructure of their own. The loan sellers 51 may log into the system 400 to update the loan information and check the sales status. The loans may gain exposure, through the system 400, to a number of buyers and therefore may be pooled and purchased relatively faster than through a conventional trust agency. The transparency of loan information in the system 400 may help the sellers 51 achieve a full market price for the mortgage loans.

On the other hand, investors or loan buyers 54 may also benefit from the system 400. For the investors or loan buyers 54, the system 400 provides a ready source of mortgage loans. The investors 54 may select loans based on one or more criteria thereby creating loan pools with desired characteristics. The selection may be achieved through database queries based on various parameters. Similarly, less desired loans with certain characteristics may be excluded. With the aggregated information in the data warehouse 42, the investors 54 may perform a detailed, online due diligence study on the selected loans prior to purchase. That is, the investors 54 may view detailed collateral data or images, and conduct historical trend analysis or scenario analysis on the selected loans. Once due diligence is done and a buyer decides to buy a portfolio of loans, the system 400 may facilitate transfer of the portfolio from account(s) of the seller(s) to that of the buyer. With the system 400 as an information base as well as an intermediary (or broker), the investors or loan buyers 54 may also be able to maintain a relatively limited sales or distribution infrastructure of their own.

The WebConnect portal 44 may feature a number of user interface screens to facilitate interactions with the system 400.

At least one selection screen may allow users to select one or more qualifying criteria for loans with desired characteristics. A user may select or screen available loans based on several factors such as, for example, borrower credit quality, loan size, property location, property type, maturity date, interest rate, and LTV ratio, etc. Either positive criteria or negative criteria or both may be used to include or exclude loans. Alternatively, some or all loans available for sale may be sorted based on user-defined criteria. For example, an investor may be interested in loans that have a high probability of being repaid as agreed. Accordingly, the investor may instruct the system 400 to select loans whose borrowers have credit ratings (e.g. FICO score) above a minimum level. The investor may only be interested in loans that are within certain range of loan amount. In that case, the investor may further specify the selection criteria to include a desired range of loan amount. For example, the selection criteria may be "borrower FICO score above 680" and "loan amount between $150,000 and $250,000." Some investors may prefer a geographically diversified loan portfolio while others may only want to buy loans whose collaterals are located in particular geographical areas. Thus, the former may limit the number of loans selected from each zip code area, while the latter may specify one or more zip codes or telephone area codes to select loans exclusively from the corresponding locations. Some investors would like to avoid mortgage assets located in high-risk areas such as flood zones, hurricane or tornado alleys. These investors may use negative criteria to exclude loans that originate from these high-risk areas.

An output and sorting screen may be provided wherein all available loans with qualifying criteria defined by the user in the selection screen are displayed. The displayed loans may include prices set by the corresponding seller(s) and other inputs from the seller(s). In the output and sorting screen, the user may be able to adjust the qualifying criteria based on the number of loans returned from the original selection. Further, the user may temporarily flag some or all of the selected loans, such that the flagged loans cannot be selected or purchased by another user during this short period when due diligence is performed.

The next user interface screen may be a due diligence screen which allows the user to perform a due diligence study on the loans selected in the earlier screens. The user may apply analytic functions in the system 400 to conduct trend, scenario, and supply-and-demand analysis on the selected loans. Via the due diligence screen, the user may be able to research the loan data at various levels of detail. For example, images of key documents for the selected loans may be viewed by the user to verify the existence of the loans, the completeness of their documentation, and whether they meet required criteria. Document images for all of the selected loans may be requested and viewed by the user. Alternatively, a random sample of these document images or other loan data may be generated for the user's inspection.

A trading screen may be provided to facilitate buying and selling of the loans. Once due diligence has been completed and the user makes a buy decision, the temporary flag placed earlier on the selected loans (to exclude selection or purchase by other users) may now be made permanent. The system 400 may cause the loans selected for purchase to be moved from the account(s) of the seller(s) to an intermediary account. Upon verification of fund transfer from the buyer to the seller(s), the system 400 may transfer the loans from the intermediary account to the buyer's account.

According to other embodiments of the present invention, the system 400 may also cause some or all of the loans to be traded in an online auction. In an auction mode, one buyer's selection of loans may not exclude other buyers from selecting or evaluating the same loans. All buyers may have an opportunity to compete for a same set of loans.

It should be appreciated that, although only loan trading is described above, the same or similar processes may also be used for financing, whereas mortgage loans may be pledged as collateral for cash borrowing or repurchase transactions. In this type of transactions, the entities who use loan portfolios as collateral may be called "pledgors" (52), and the entities who take a security interest in the loan portfolios may be called "pledgees" (53). The plegors 52 may select loans to be pledged based on the pledgees' pre-determined specifications of acceptable collateral. The pledgees 53 may perform due diligence of pledged collateral before making lending decisions. That is, through the various user interface screens and the underlying system 400, the users may also select and evaluate loan collaterals that are to be pledged or sold.

The system and method for post closing and custody services in accordance with embodiments of the present invention may be typically implemented in a computer-based system. The computer-based system may comprise one or more processors and/or computers capable of data manipulation, logic operation and mathematical calculation. The system may further comprise one or more databases for storing and managing electronic images of the loan documents and management data associated therewith. In addition, a number of user interfaces and/or remote access ports may be provided for users to manage and access the document images. The system may be implemented on computers or computer networks.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A computer-implemented method for post closing and custody services, wherein the method is executed by a programmed computer processor which communicates with one or more post closing users via a network, the method comprising:

imaging, by a document custodian using at least an imaging device, and storing in a database, at least a portion of loan documents shipped directly from a closing agent to the document custodian upon closing of a loan, wherein the document custodian is a separate entity from the closing agent at a different site, and the document custodian maintains custody for safekeeping of the loan documents and determines compliance for securitization;

performing, by the document custodian using at least the programmed computer processor, a custody review of the loan documents to identify exceptions and log the exceptions in the database prior to other post closing services associated with the loan; and providing, by at least the programmed computer processor, the one or more post closing users remote access to the one or more of the imaged documents stored in the database via the network to enable the one or more post closing users to concurrently conduct post closing services after the custody review by the document custodian, thereby enabling the avoidance of redundant review of loan documents by the document custodian and post closing users.

2. The method according to claim 1, wherein the custody review comprises:
identifying documents that are associated with warehouse lending and securitization of the loan; and
reviewing these documents to cure exceptions.

3. The method according to claim 1 further comprising:
receiving electronic data associated with the loan; and
correlating the electronic data with the loan documents.

4. The method according claim 1, wherein the one or more post closing users are selected from a group consisting of:

a loan originator;
the closing agent;
a warehouse lender;
a loan servicer;
a loan borrower;
a document custodian;
a post closing service provider;
a government inspector;
a buyer of the loan;
a pledgor that treats the loan as collateral; and
a pledgee that treats the loan as collateral.

5. The method of claim 1, further comprising aggregating loan data and document images associated with a plurality of loans, thereby, based on the loan data and document images, facilitating, by at least the programmed computer processor, one or more functions selected from the group consisting of: an online trading of at least one of the plurality of loans, a financing transaction that uses at least one of the plurality of loans as collateral, an online due diligence study on at least one of the plurality of loans, and an online performance analysis on at least one of the plurality of loans.

6. A computer-implemented method for post closing and custody services, wherein the method is executed with a programmed computer processor which communicates via a network, the method comprising:
receiving, by a document custodian, loan documents shipped directly to the document custodian from one or more closing agents, wherein the document custodian is a separate entity from the closing agents, the document custodian is located at a different site from the closing agents, and the document custodian maintains custody for safekeeping of the loan documents and determines compliance for securitization;
imaging, by the document custodian using at least an imaging device, and storing in a storage device, at least a portion of the loan documents shipped directly from the one or more closing agents upon closing of a loan, wherein the loan documents are associated with a plurality of loans from one or more loan originators, and the document custodian is a separate entity from the loan originators;
performing, the document custodian using at least the programmed computer processor, a custody review of the loan documents to identify exceptions and log the exceptions in the storage device prior to other post closing services associated with the loan;
aggregating, by at least the programmed computer processor, loan data and document images associated with the plurality of loans for storage in the storage device; and
providing, by at least the programmed computer processor, remote electronic access to the aggregated loan data and document images stored in the storage device via the network to enable the one or more post closing users to concurrently conduct post closing services after the custody review by the document custodian, and to provide the aggregated loan data to investors.

7. The method according to claim 6 further comprising:
generating a report based on the aggregated loan data and document images.

8. The method according to claim 6 further comprising:
identifying at least one of the plurality of loans based on one or more criteria received from a user.

9. The method according to claim 8 further comprising:
facilitating online trading of the at least one selected loan.

10. The method according to claim 8 further comprising:
facilitating a financing transaction that uses the at least one selected loan as collateral.

11. The method according to claim 8 further comprising:
facilitating an online auction of the at least one selected loan.

12. The method according to claim 8 further comprising:
facilitating an online due diligence study on the at least one selected loan.

13. The method according to claim 8, further comprising:
facilitating an online performance analysis on the at least one selected loan.

14. The method according to claim 6, further comprising:
sorting at least one of the plurality of loans based on one or more user-defined criteria.

15. A system for post closing and custody services, the system comprising an imaging device, a processor, a data storage device, and a user interface, wherein:
the data storage device contains loan data and document images associated with a plurality of loans;
the processor is operatively coupled to the data storage device to provide information associated with the plurality of loans based on the loan data and the document images via a network, and the processor being further configured to coordinate the collection of physical loan documents associated with the plurality of loans shipped directly from one or more closing agents to a document custodian and to generate the document images with the imaging device and the loan data based on the loan documents shipped directly to the document custodian, wherein the loan data is generated at least in part from a custody review performed by the document custodian, the document custodian is a separate entity from the closing agents, the document custodian is located at a different site from the closing agents, and the document custodian maintains custody for safekeeping of the loan documents; and
the user interface facilitates remote electronic access to the information, the loan data and the document images stored in the data storage device, thereby enabling one or more post closing users to concurrently conduct post closing services after the custody review by the document custodian, thereby enabling the avoidance of redundant review of loan documents by the document custodian and post closing users.

16. The system according to claim 15, wherein the system is further configured to generate a report based on the aggregated loan data and document images.

17. The system according to claim 15, wherein the system is further configured to identify at least one of the plurality of loans based on one or more criteria received from a user.

18. The system according to claim 17, wherein the system is further configured to facilitate one or more functions selected from a group consisting of:
an online trading of the at least one selected loan;
a financing transaction that uses the at least one selected loan as collateral;
an online due diligence study on the at least one selected loan; and
an online performance analysis on the at least one selected loan.

19. A loan document management system comprising:
a memory;
an imaging device; and
a computer processor, wherein the computer processor is programmed to:
coordinate the collection of physical loan documents shipped from one or more closing agents directly to a document custodian, wherein the document custodian is a separate entity from the closing agents, the document custodian is located at a different site from the closing agents, and the document custodian maintains custody for safekeeping of the loan documents;

receive, from the imaging device, electronic images of the physical loan documents generated by the document custodian;

store the electronic images in the memory;

receive loan data from at least the document custodian, wherein the loan data is generated at least in part from a custody review performed by the document custodian prior to other post closing services associated with a loan, and the loan data includes exceptions resulting from the custody review relevant to compliance for loan securitization;

store the loan data in the memory; and provide remote electronic access via a network to the loan data and the electronic images stored in the data storage device, thereby enabling one or more post closing users to concurrently conduct post closing services after the custody review by the document custodian to enable the avoidance of redundant review of loan documents by the document custodian and post closing users and to expedite the post closing services.

20. The system of claim 19, further comprising aggregating the loan data and electronic images associated with a plurality of loans, thereby, based on the loan data and electronic images, facilitating, by at least the computer processor, one or more functions selected from the group consisting of: an online trading of at least one of the plurality of loans, a financing transaction that uses at least one of the plurality of loans as collateral, an online due diligence study on at least one of the plurality of loans, and an online performance analysis on at least one of the plurality of loans.

* * * * *

UNITED STATES PATENT AND TRADEMARK OFFICE
CERTIFICATE OF CORRECTION

| | | |
|---|---|---|
| PATENT NO. | : 8,688,569 B1 | Page 1 of 1 |
| APPLICATION NO. | : 11/086569 | |
| DATED | : April 1, 2014 | |
| INVENTOR(S) | : Myer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 477 days.

Signed and Sealed this
Thirtieth Day of May, 2017

Michelle K. Lee
*Director of the United States Patent and Trademark Office*